Nov. 12, 1957     L. E. SODERQUIST     2,812,544
PRESS FOR SHAPING AND VULCANIZING PNEUMATIC TIRES
Filed Aug. 3, 1954     6 Sheets-Sheet 1

INVENTOR.
BY LESLIE E. SODERQUIST
ATTORNEYS

Nov. 12, 1957 L. E. SODERQUIST 2,812,544
PRESS FOR SHAPING AND VULCANIZING PNEUMATIC TIRES
Filed Aug. 3, 1954 6 Sheets-Sheet 2

INVENTOR.
LESLIE E. SODERQUIST
BY
ATTORNEYS

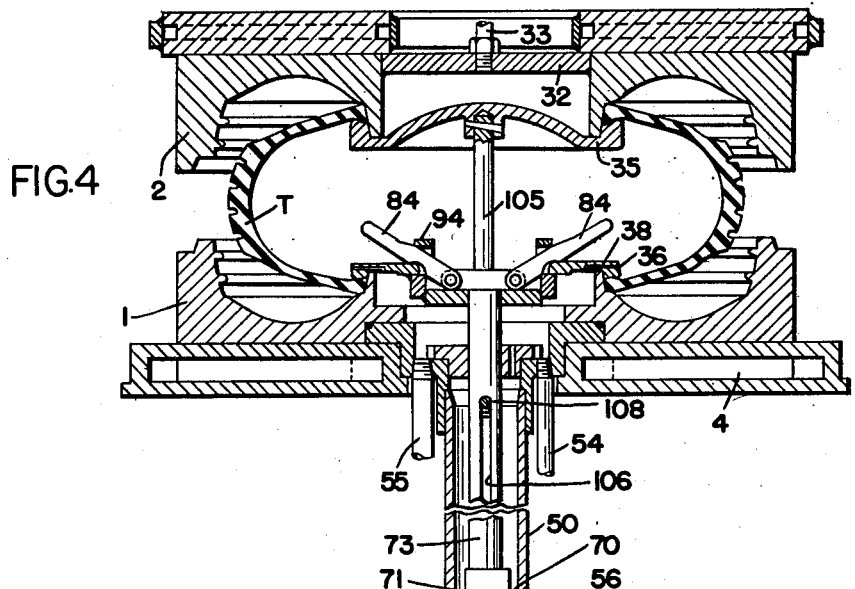
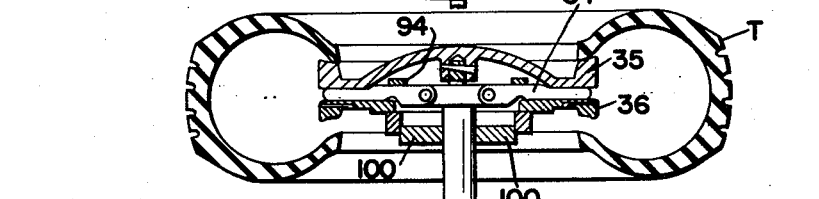
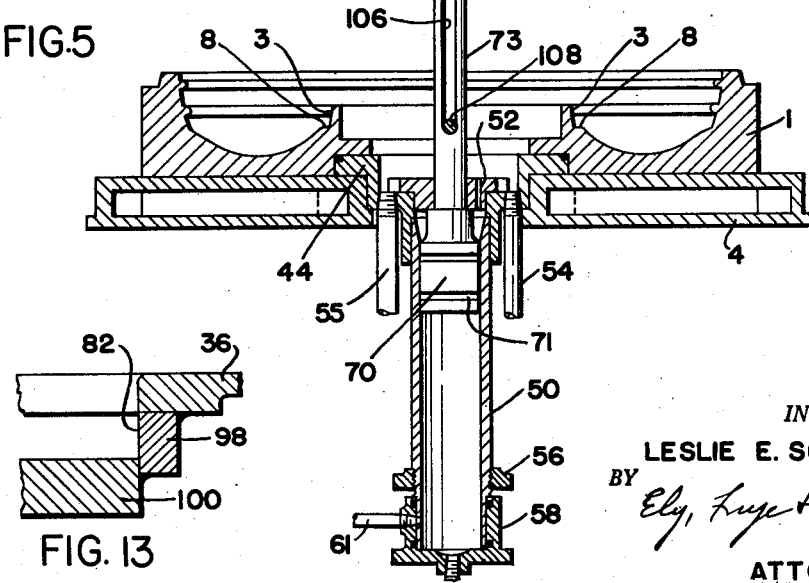

Nov. 12, 1957  L. E. SODERQUIST  2,812,544
PRESS FOR SHAPING AND VULCANIZING PNEUMATIC TIRES
Filed Aug. 3, 1954  6 Sheets-Sheet 4
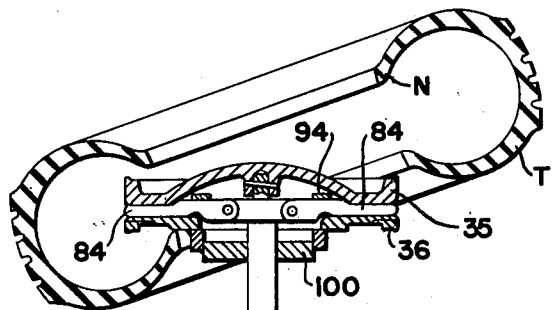
FIG. 6
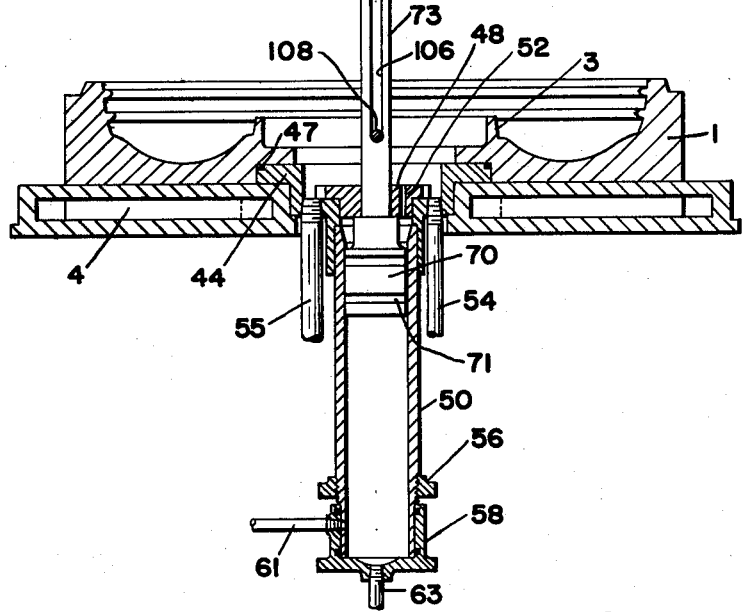
FIG. 7
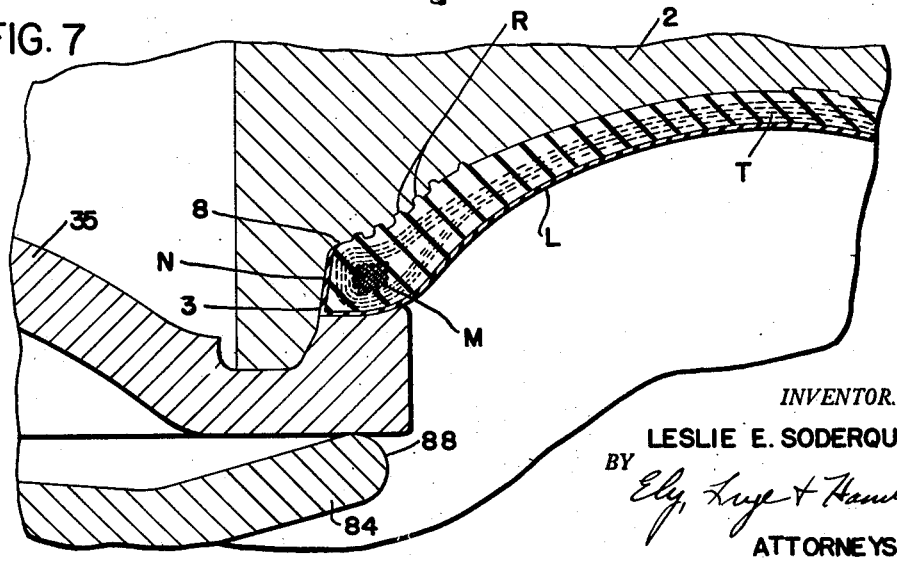
INVENTOR.
LESLIE E. SODERQUIST
BY
ATTORNEYS Nov. 12, 1957  L. E. SODERQUIST  2,812,544
PRESS FOR SHAPING AND VULCANIZING PNEUMATIC TIRES
Filed Aug. 3, 1954  6 Sheets-Sheet 5

*INVENTOR.*
LESLIE E. SODERQUIST
BY
ATTORNEYS

Nov. 12, 1957 L. E. SODERQUIST 2,812,544
PRESS FOR SHAPING AND VULCANIZING PNEUMATIC TIRES
Filed Aug. 3, 1954 6 Sheets-Sheet 6
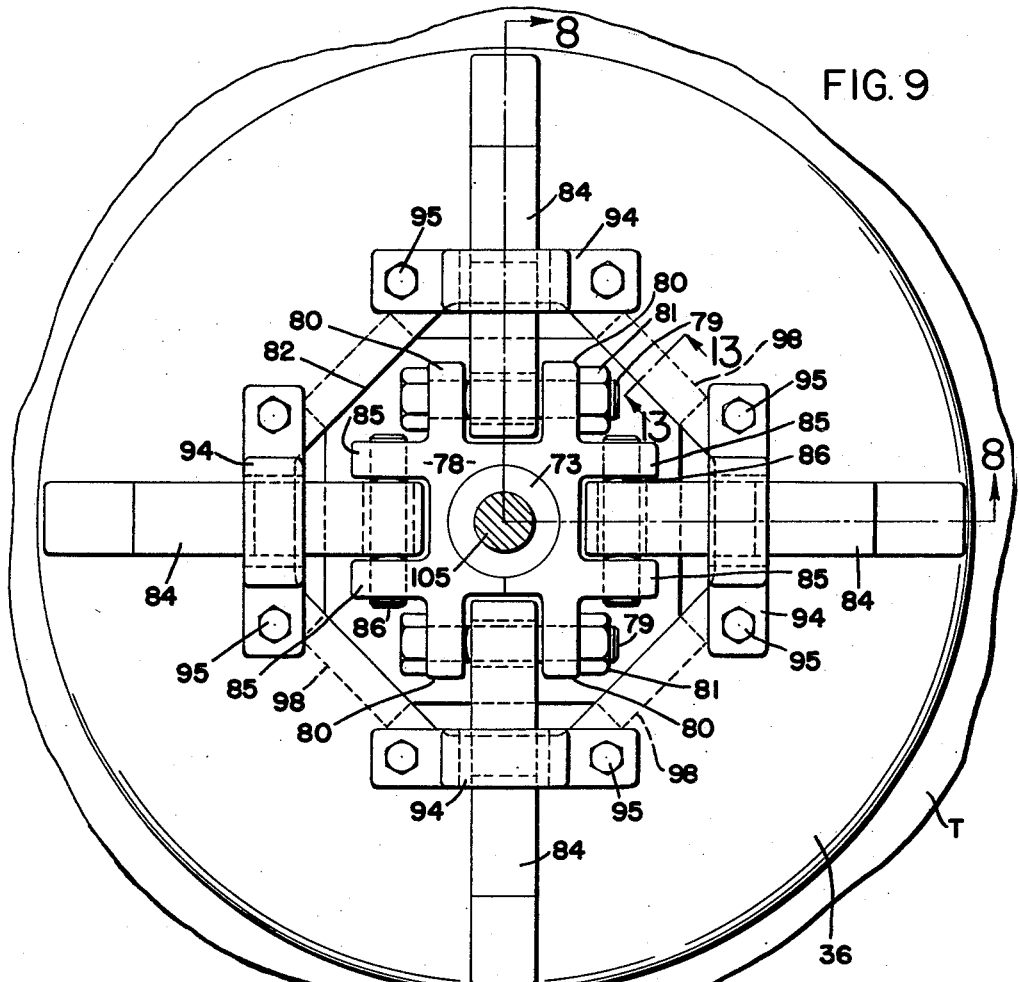
FIG. 9
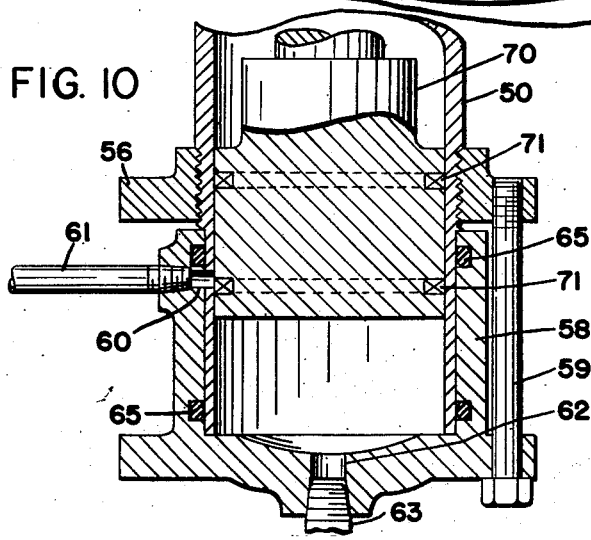
FIG. 10
FIG. 11
INVENTOR.
LESLIE E. SODERQUIST
BY
Ely, Frye & Hamilton
ATTORNEYS

2,812,544

PRESS FOR SHAPING AND VULCANIZING PNEUMATIC TIRES

Leslie E. Soderquist, Akron, Ohio, assignor to The McNeil Machine & Engineering Company, Akron, Ohio, a corporation of Ohio Application August 3, 1954, Serial No. 447,476

14 Claims. (Cl. 18—17)

The present invention relates to a new and improved press for the shaping of unvulcanized tire bands into tire form and vulcanizing them without removing them from the press.

The art of shaping and curing tires on inflatable diaphragms in a single operation has been perfected due to the developments made by the present inventor. These presses are well known in the art and have replaced older methods and machines for the curing of pneumatic tires.

With the increased use of so-called "tubeless tires" which are provided with air impervious inner linings, usually of butyl rubber, it has been found that the tire bands may be shaped and vulcanized under high internal pressure without the interposition of an air bag or flexible diaphragm.

The problem which has to be met in adapting this idea to practical use has been the perfection of means to seal the bead portions of the tire during curing against loss of internal pressure at those points and to mechanically mold the beads to exact contour by the use of rigid forming means. High pressure steam or superheated water are used in accordance with the practices preferred by individual tire companies and a device to be practical must effectively seal at those points.

It is also a problem to devise some effective means for manipulating the sealing means which should operate upon the closing of the press to grip the inside bead portions of the tire and hold them firmly against the bead molding surfaces and then release the tire after vulcanization. The machine must be automatic in its operation and highly dependable; otherwise, loss of product and possible injury to workmen would occur.

The machine shown and described herein is relatively simple in its operation and provides mechanism which will tightly grip the beads and hold them in tight sealing relation with the mold during the curing operation. The operation is automatic on the closing of the press and then on the opening of the press. The mechanism is such that it does not interfere with the shaping of the tire because it permits the bead portions of the tire to roll upon themselves as the tire is converted from its original flat band form to the tire shape in which it is vulcanized.

On opening the press, provision is made to drain any water or other residual liquid out of the tire and thereafter the vulcanized tire is removed from both mold sections and supported out of contact with both sections until removed by the operator.

The machine shown herein also forms the tire properly at the beads. This is a very important consideration for any tire curing device.

There are many advantages to the press shown and described herein, the major one being the elimination of the air bag or diaphragm with equally satisfactory results in the curing of the tire.

The drawings and description are detailed to enable one skilled in this art to understand the principles and workings of the apparatus, but it will be appreciated that the details are not essential and may be varied or modified within the scope of the advance in the art and the appended claims.

The press operating mechanism is shown and described in applicant's copending application, Serial No. 416,598, filed March 16, 1954. This mechanism is optional only as any other forms of press-operating mechanism may be used. It is essential that the movable mold section be moved in a direct line during the final shaping operation. The movable mold section, which may be the upper or lower section, may be moved in a straight line during the entire opening and closing operation, or only during the latter part of the closing movement and the commencement of the opening movement, i. e., during the period that the mold sections are in contact with both beads of the tire.

In the drawings:

Fig. 4 is a view showing the start of the opening movement with the cured tire separating from the upper and lower mold sections.

Fig. 5 shows the mold fully opened with the cured tire raised from the lower mold section.

Fig. 6 shows the tire lifted off the bead clamping rings.

Fig. 7 is a detail at a bead.

Fig. 9 is a horizontal section on the line 9—9 of Fig. 8.

Fig. 10 is a detail at the lower end of the ring operating cylinder.

Figure 8:
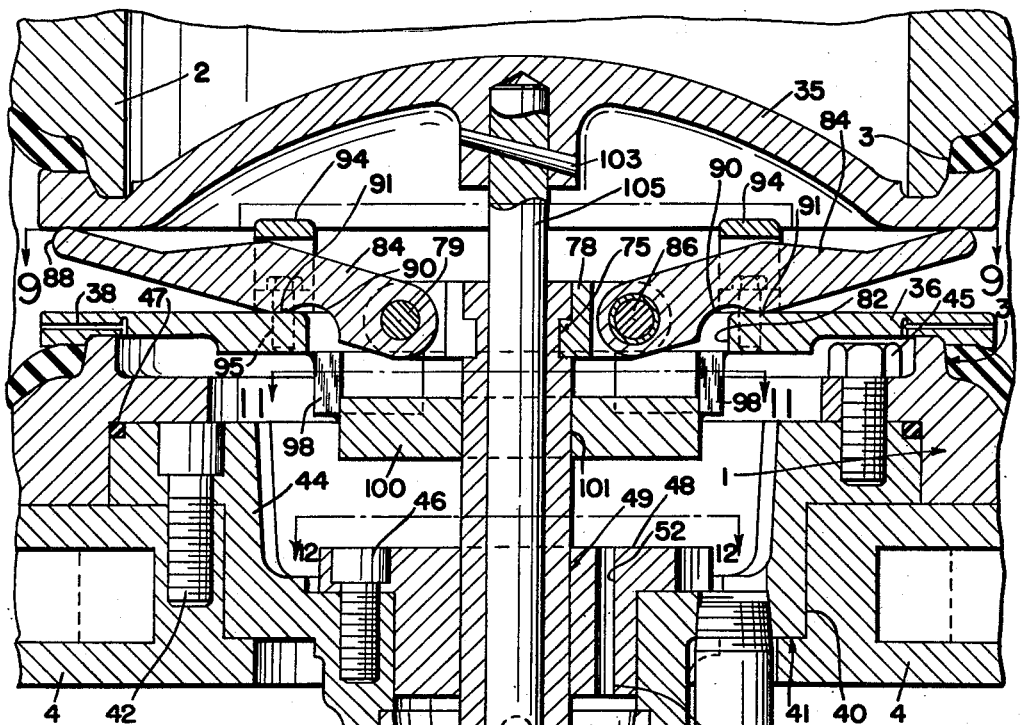
Fig. 8 is an enlarged detail section through the bead clamping rings and the mechanism for operating them. This view is taken on the angular section line 8—8 of Fig. 9.
Figure 12:
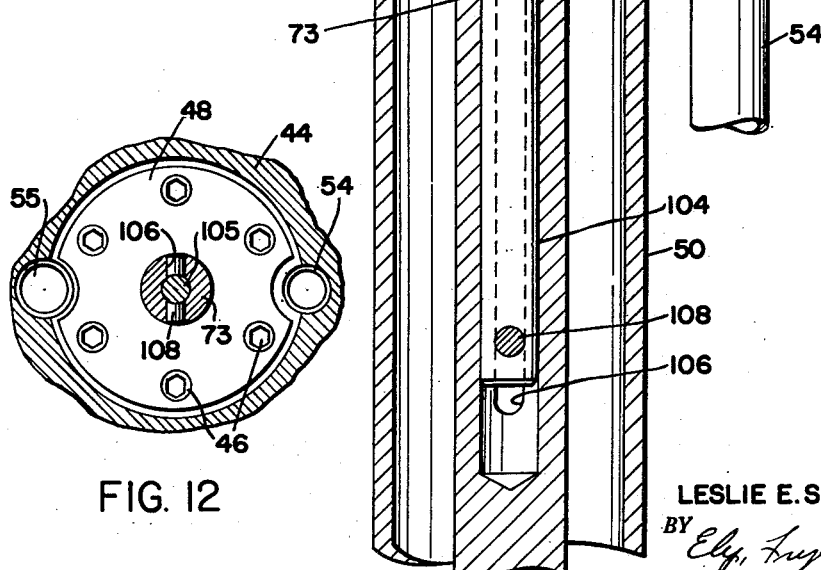

Figs. 11 and 12 are sections on the lines 11—11 and 12—12 of Fig. 8 respectively.

Fig. 13 is a section on the lines 13—13 of Figs. 9 and 11.

A tubeless tire T, for the curing of which this press is especially designed, is substantially the same as any other tire except for the provision of an impervious lining L on the interior of the tire and sealing ribs R along the exterior of the beads. A tubeless tire usually has a tapered under surface at each bead M as shown at N to provide a tight fitting area at the bases of the beads when mounted on the rim.

Figure 1:
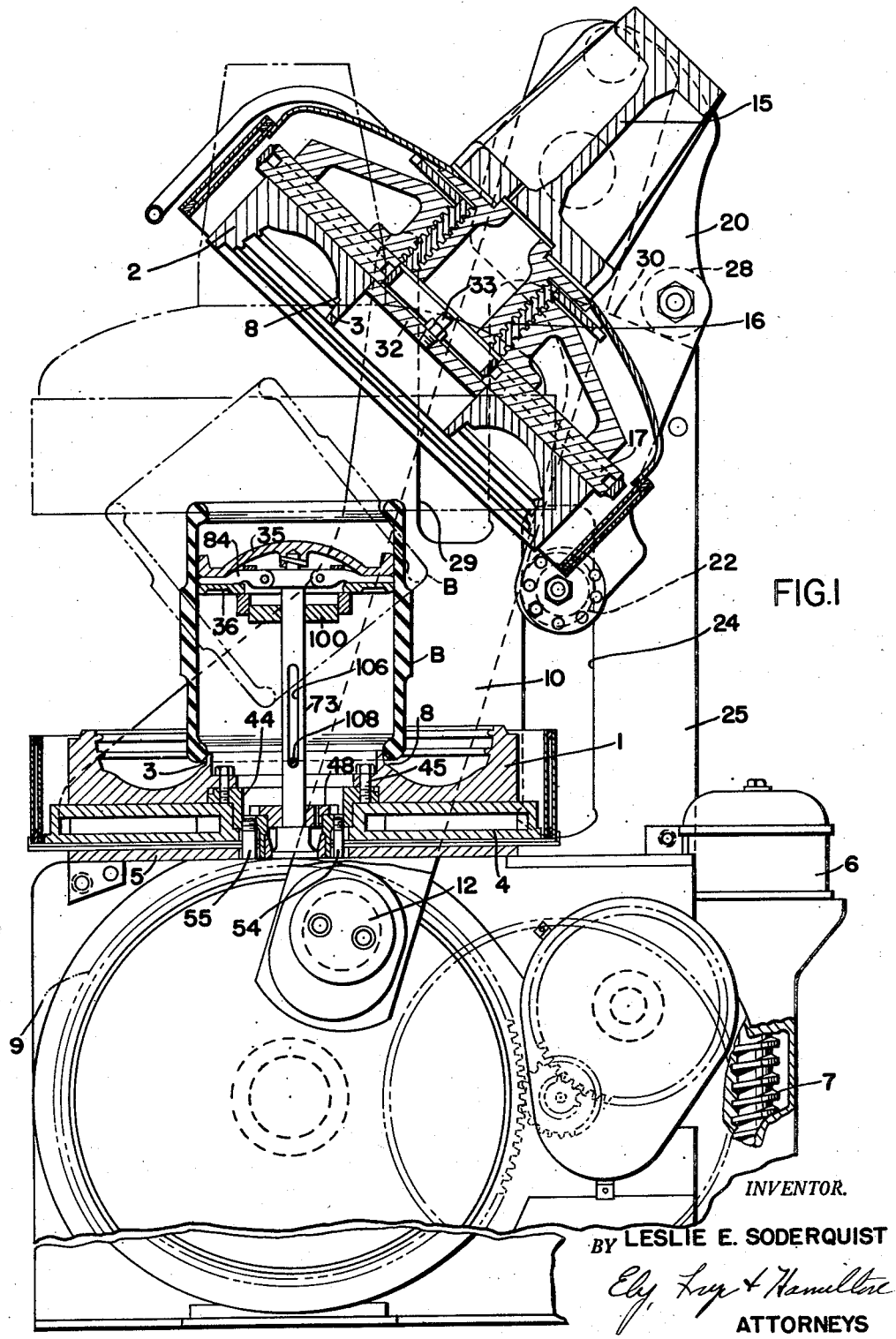
Fig. 1 is an elevation, partly in section, of a press of the type set forth in open position and with an unformed and unvulcanized tire band in place on the lower mold section.

As indicated above, the press in which the bead rings and their operating mechanism are shown is of the type in which the lower mold 1 is stationary while the upper mold 2 is movable and in which the upper mold rocks at the upper end of its opening movement to the position shown in Fig. 1, so as to allow the operator to place the uncured tire band B in position and to remove the cured tire T.

On the closing movement of the press, the upper mold is first rocked into position so that it is parallel to but spaced from the lower mold section, as shown in dotted lines in Fig. 1, and is then moved downwardly in a direct line during the final closing operation. This allows the upper mold section to contact with and exert the required pressure on the band, which, with the admission of a low shaping pressure to the interior of the band, will bring it to tire form concurrently with the closing of the press. When the press is closed, the full shaping pressure is admitted to the interior of the tire. Before the press opens at the end of the curing cycle, the pressure within the tire is relieved. These operations are all controlled by automatic timing devices (not shown) so that all the operator is required to do is to place the uncured tire band on the lower mold and press a button. At the end of the operation he removes the cured tire.

The press may be one which moves the upper mold in a straight line throughout its entire cycle or it may be one in which the upper mold section is stationary and the lower mold section moved. It will be noted that each mold has bead-seat 8, which is provided with a tapered shoulder 3 to form the surfaces N on the undersides of the tire beads.

Only so much of the mechanism for operating the movable mold section in the press shown herein will be described as is necessary for a full understanding of this invention. Extended reference may be made to applicant's copending application for a more complete description.

The lower mold section 1 is mounted upon a steam heated platen 4 which is supported on the bed 5 of the press. At the side of the press is the motor 6 which, through worm gear 7 and intermediate drive mechanism, rotates large bull gears 9 at either side of the press. Heavy links 10 extend from bearing pins 12 on the bull gears to a cross head 15, to the underside of which is attached the upper mold 2 through the adjustable connection 16 and the heated platen 17.

The rocking and straight line movement of the upper mold during the opening and closing of the press is controlled by a guide arm 20 on each side of the press having a lower roller 22 which moves in a vertical slot 24 formed in guide plate 25 rising from the bed of the press.

Also mounted on each guide arm 20 is a second roller 28 which, during the latter part of the closing movement and the fore part of the opening movement, rides in a vertical slot 29 in the guide plate. The upper end of slot 29 is open and extending rearwardly therefrom is a downwardly and rearwardly inclined trackway 30 for the roller 28.

As the press is opened through the upward movement of the links 10, the rollers 22 and 28, riding in their parallel guideways, raise the upper mold in a straight line until the rollers 22 reach the upper ends of the slots 24, at which time the rollers 28 are at the upper end of the guideways 29. Continued upward movement of the links 10 causes the guide arms 20 to rock about the axes of rollers 22 and the rollers 28 to ride down the trackways 30 to the open position shown in Fig. 2. On the closing movement, the upper mold first rocks into parallelism with the lower mold and is then moved downwardly in a straight line through the action of the guiding rollers and guiding slots.

It will be noted at this point that the usual central opening in the upper mold is closed by a plate 32, in which may be located a conduit 33 for exhausting any pressure that may occur in the chamber beneath the plate 32 during cure.

The mechanism for gripping the edges of the tire band and sealing the beads against the upper and lower molds consists generally of an upper bead gripping ring 35 and a lower bead gripping ring 36. When the press is open at the beginning and end of each cycle, the rings 35 and 36 are together and elevated above the lower mold as shown in Figs. 1 and 5. During the latter part of the closing operation, the rings are together but lowered into position just above the bead seat on the lower mold section.

Figure 3:
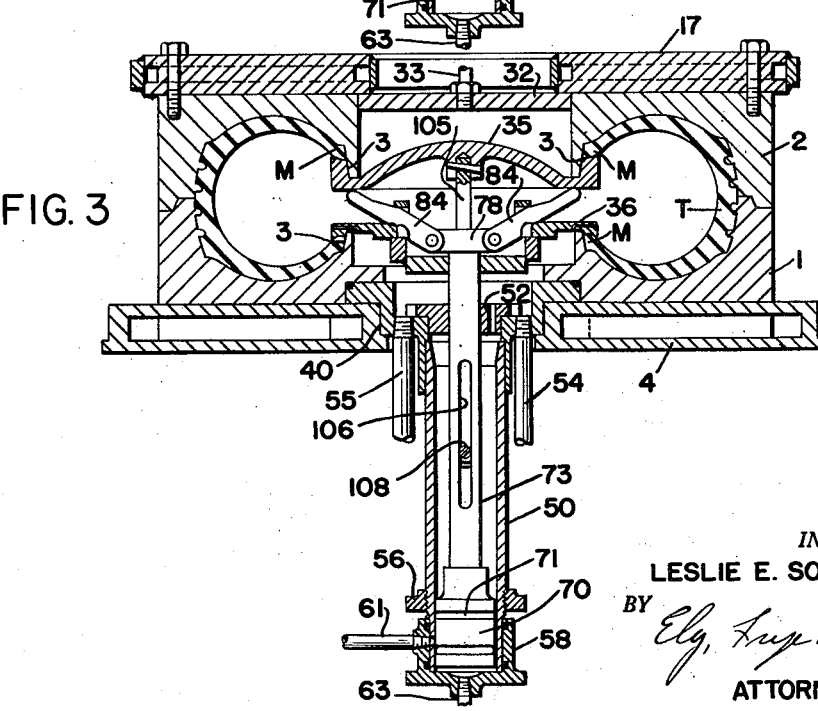
Fig. 3 is a similar view but with the mold fully closed and the bead gripping rings engaging the beads of the tire.

When the molds close about the shaped band, the two rings are spread apart to the position shown in Fig. 3 where they exert a sufficient degree of pressure on the beads M to force the beads along the tapered surfaces 3 until they are firmly located in the bead seats of the molds. The pressure is maintained on the beads during the entire cure so that the interior of the tire is securely sealed against loss of pressure around the beads, and the beads are accurately molded to shape.

It will be noted at this point that the bead gripping rings do not engage the beads M until the band is fully or substantially fully shaped. The purpose of this is to allow the beads to roll upon themselves without restriction during the transition of the band from band form to tire shape. This is important because the shifting of the tire fabric about the wire bead cores must be allowed for; otherwise, the tire will not properly form. It is also to be noted that a very considerable pressure is exerted at the bead areas of the tire during the curing operation in order to form the beads properly. Mechanism to spread the bead rings apart at the proper time in the operation of the press will be described. It will be understood that while the devices shown constitute the best known and preferred form of the invention, the invention in its broader aspects is not restricted to the specific devices shown. It is important to provide passages 38 in the lower ring 36 to allow for the escape of water of condensation from the tire (see Fig. 8), and to spread the tire apart and hold it for a sufficient period to allow water of condensation or other residual liquid, which will collect on the lower inside surface of the tire, to be drained from the tire before the press is fully opened or the tire removed.

*The mechanism for operating the bead clamping rings*

Formed in the lower platen 4 is a circular opening 40 with an inwardly projecting ledge 41. Seated in this opening and held therein by bolts 42 is a ring-shaped gland 44. The lower mold section 1 is fitted over this gland and held therein by bolts 45. A packing ring 47 seals the crack between the mold and the gland. Held in the gland 44 by bolts 46 is a plug 48 through the center of which is a passage 49, and fitted in the underside of the gland 44 is a cylinder 50 which extends downwardly into the base of the press for a sufficient distance to allow for the operation of the rings.

A passage 52 in the plug 48 permits the passage of pressure fluid from the interior of the band to the top of the cylinder. Set in the gland 44 are the two conduits 54—55 which admit and release the final shaping and curing high pressure steam or water to the interior of the tire.

Near its lower end, the cylinder 50 is threaded to a ring 56, and at its lower end the cylinder is closed by a relatively deep cap 58 which is held in place by bolts 59 threaded into the ring 56. Above the lower end of the cap 58 is a port 60 in which is threaded a first exhaust pipe 61 which is in communication with the interior of the cylinder. At the bottom of the cap is a second port 62 in which is threaded the pipe 63, which may serve either as an exhaust pipe or inlet pipe for fluid pressure to and from the underside of the piston 70. O-rings 65 seal the space between the cylinder and the cap.

In the cylinder 50 is movable the piston 70, in which are fitted expansion piston rings 71 and to which is attached the piston rod 73, the upper end of which extends through the opening 49 in the plug 48. At its upper extremity, the rod 73 is grooved as at 75 (Fig. 8). Around the rod is fitted the split collar 78 which is machined to fit the groove 75 in which it is held by the two bolts 79 which pass through opposed wings 80 on the two sections of the collar (Fig. 9). The lower ring 36 is formed with a centrally located octagonal opening 82, the outline of which is shown in Fig. 9, in which the split collar may move.

The bolts 79 form pivots for the inner ends of two lifting arms or levers 84 spaced 180° apart. On the side of each section of the collar 78 are lugs 85 in which are located pins 86 which constitute bearings for the inner ends of the additional lifting arms or levers 84 located midway between the levers previously described.

These four levers or arms constitute the means for spreading the two rings 35 and 36, being extended as shown in the drawings between the two rings. The outer ends of the levers are reduced in thickness with parallel sides so that when the collar 78 is at the plane of the top of the lower ring, the levers are horizontal and the two rings are in their nearest position. This is the condition shown in Figs. 1, 2 and 5. The outer ends of the levers are rounded as shown at 88 to form a rolling contact with the underside of the ring 35 against which they bear.

On the underside of each lever 84 is a recess 90, on the outer side of which is a rounded shoulder 91 which bears on the top of the lower ring 36 to form fulcrums about which the levers are rocked to spread the rings 35 and 36 apart, as is shown in Fig. 8. An arched strap 94 is secured by bolts 95 threaded into the lower ring 36 at each lever to keep the same in place. These straps are located at four sides of the octagonal opening 82.

To the lower side of the ring 36, and located at the alternate sides of the opening 82, are welded the four blocks 98, to the lower ends of which is welded the plate 100 provided with a central aperture 101 having a sliding fit around the piston rod 73.

The upper bead clamping ring 35 is pinned at 103 to the upper end of a secondary piston rod 105 which has a close sliding fit with an axial bore 104 extending part way down into the piston rod 73. The sides of the bore 104 are slotted as at 106 and located in the lower end of the secondary piston is a pin 108 extending through the slot 106.

Figure 2:
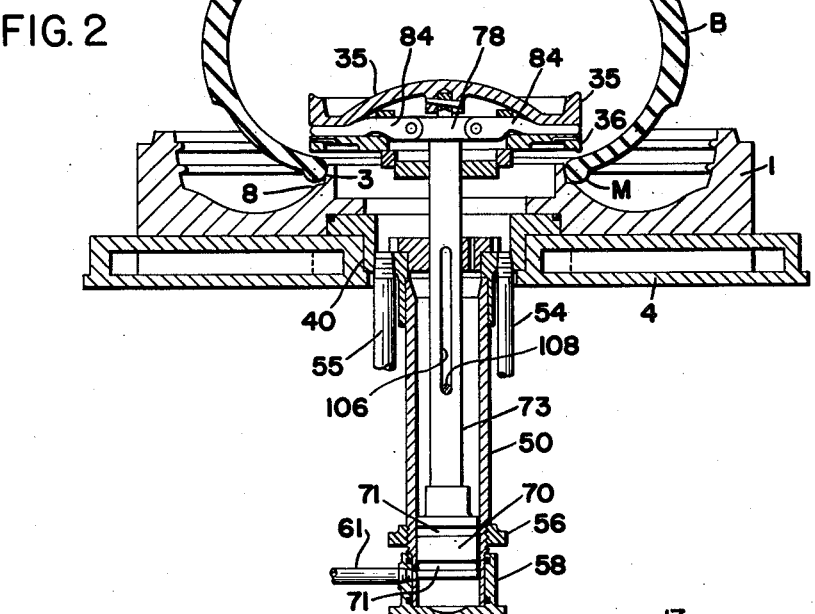
Fig. 2 is a sectional view showing the approach of the two mold sections with the partially shaped band and with the bead gripping rings in idle or inactive position.

Comparing Figs. 2, 3 and 4, for example, it will be seen that when the pin 108 is at the bottom of the slots 106, the rings are together and the levers 84 are horizontal. When the levers 84 are rocked about their fulcrums, as in Fig. 3, the two rings 35 and 36 are forcibly spread apart and the pin 108 has risen part way in the slots 106. This is the operation which exerts pressure on the two rings to clamp the beads in their seats in the mold.

This is the condition shown in Fig. 3, which is maintained during the cure, at which time the beads of the tire are held firmly in their seats. This pressure is exerted on the levers by the high pressure steam which is admitted to the tire through the conduit 54 as soon as the mold sections have closed about the tire. The high pressure steam enters the top of the cylinder 50 through the port 52 and acts upon the top of the piston 70 which draws the collar 78 downwardly, rocking the levers as shown in Fig. 3 to exert and maintain upward pressure on the ring 35 and downward pressure on the ring 36. The high pressure steam finds its way into the tire through the passages in the lower ring assembly. At the time the high pressure steam is on, the hydraulic pressure on the underside of the piston has been relieved through the conduit 63.

When the cure is completed, and before the high pressure steam is completely exhausted, the press starts to open, whereupon the pressure which is still acting upon the top ring 35 raises the ring 35, while the lower ring 36 is held down by the counter pressure on the top of the piston 70, plus the weight of the parts. This action is shown in Fig. 4 and results in stripping the cured tire from both mold sections. The spreading movement of the two rings continues until the pin 108 reaches the top of the slot. As the mold sections are only partially opened at this time, there is no danger of blowing out the tire. The spreading of the tire at this point in the operation performs the important function of draining water of condensation from the tire before the mold is fully opened. It may be desirable to slow down or interrupt the opening movement of the press to give adequate time for any water which is lying in the inside of the tire to escape. Passages 38 assist in the draining of the water.

When this stage in the opening cycle has been reached, the top mold continues to rise, freeing the tire therefrom, and then the high pressure steam is completely exhausted and drained through the conduit 55 which permits the top ring 35 to return to lowered position. Hydraulic pressure is then admitted to the underside of the piston 70 by reversing the flow of pressure in the pipe 63, the result of which is to raise the piston 70 and the collar 78, which lifts the ring assembly, in collapsed position, and strips the vulcanized tire from the lower mold section, presenting the tire in position to be lifted out of the press and the insertion of a new band. The press-operating mechanism is stopped when the upper mold has moved to the position shown in full lines in Fig. 1.

After the cured tire is removed, the ring assembly is left in its raised position while an uncured band is placed in the press as shown in Fig. 1. This holds the band in position to be engaged by the upper mold section during the closing of the press.

When the band is in position, the operator presses the starter button, which rocks the upper mold to its position in parallelism with the lower mold and then starts it in its straight-line closing movement. At or shortly after the upper mold has moved into its parallel position, it will engage the upper edge of the band and continued movement will initiate the shaping of the band. At this point, pressure in the lower end of cylinder 50 is released through the upper port 61 and the ring assembly moves to the position shown in Fig. 2. During this shaping movement it is desirable to admit air or low pressure steam to the interior of the band to assist in the formation thereof.

As the port 61 is above the bottom of the cap 58, the piston 70 will be lowered only past this port and will be held in slightly elevated position by the residual fluid in the bottom of the cylinder. This is the condition of affairs shown in Fig. 2 where the lower ring 36 is elevated slightly above the lower tire bead. By maintaining this raised position of the ring assembly, the tire band is permitted to roll upon itself at the beads.

When the press is completely closed, the reversal of pressure in the cylinder 50 spreads the rings apart, as has been described.

The above gives a full description of the sequence of steps from the opening of the press at the end of a cure to the closing of the press at the commencement of the next cure. It will be seen that an efficient mechanism has been provided to force the tire band into its proper position for cure and to hold it there during the cure. The operation at the end of each cure drains water of condensation or other residual liquid from the cured tire and strips the tire from both heated sections so that there is no danger of ruining the tire by contact with the hot molds after the curing cycle is completed.

The diaphragm has been completely eliminated in the case of tires which are so constructed as to be impervious to the passage of fluid pressure through the tire. The act of opening the mold through the separation of the bead clamping rings at the commencement of that movement allows liquid to drain from the tire, and strips the tire from both mold sections as shown in Fig. 4.

As will be observed from Fig. 1 of the drawings, the elevated rings 35 and 36 act as a centering device for the upper end of the uncured tire band, holding the upper tire bead in direct line with the bead seat on the upper mold. This insures that the band will be accurately centered. In the use of diaphragm presses such as shown in Fig. 8 of my prior Patent No. 2,699,572 of January 18, 1955, the distended diaphragm serves to center the tire band, but when there is no diaphragm, as in the present disclosure, the two bead clamping rings serve the same purpose until the upper mold registers with the upper edge of the tire band, whereupon they are withdrawn as the mold closes about the band.

While the machine was designed with a view to its adaptability for tubeless tires, it may be used for the curing of any standard tire. Timing mechanism to govern and control the opening and closing movements of the press and the admission and exhaust of steam and hydraulic pressure are well known in this art and need not be described.

What is claimed is:

1. A press for the shaping and curing of tires from bands in which the pressure shaping and curing medium is in direct contact with the interior of the tire, two relatively movable mold sections, means for moving the mold sections together with an uncured tire band between them, a pair of bead clamping rings located between the edges of the band, and means to separate the rings when the mold is closed to exert pressure against the inside surfaces of the bead portions of the band.

2. A press for shaping and curing tires from bands, two relatively movable mold sections having bead seats, means for moving the mold sections together with the tire beads on the seats, a clamping ring assembly comprising two bead clamping rings located between the tire beads, means to hold the asesmbly out of contact with the tire beads while the band is changing to tire shape during the closing movement of the press, and means operative after the press has closed to spread the rings apart to force the beads of the tire onto the seats.

3. A press for shaping and curing tires from bands, two relatively movable mold sections having bead seats, means for moving the mold sections together with the tire beads on the seats, a clamping ring assembly comprising two bead clamping rings located between the tire beads, yielding means to hold the assembly out of contact with the tire beads while the band is changing to tire shape during the closing movement of the press, and means operative after the press has closed to spread the rings apart to force the beads of the tire onto the seats.

4. A press for shaping and curing tires from bands, two relatively movable mold sections having bead seats, means for moving the mold sections together with the tire beads on the seats, a clamping ring assembly comprising two bead clamping rings located between the tire beads, yielding means to hold the assembly out of contact with the tire beads while the band is changing to tire shape during the closing movement of the press, and means operative after the press has closed to spread the rings apart to force the beads of the tire onto the seats and hold them in that position during the curing period.

5. A press for the shaping and curing of tires from bands, two relatively movable mold sections having opposed bead seats, means for moving the sections toward each other with the edges of the uncured band located in the seats and for separating the mold sections after curing, a pair of bead clamping rings between the edges of the band, and means to spread the rings to exert pressure on the beads while the mold sections are in contact and to separate the rings to a greater extent on the opening of the press to spread the bead portions of the cured tire.

6. A press for the shaping and curing of tires from bands, two relatively movable mold sections having opposed bead seats, means for moving the sections toward each other with the edges of the uncured band located in the seats and for separating the mold sections after curing, a pair of bead clamping rings between the edges of the band, and means acting on the rings to force the edges of the bands on the bead seats when the mold is closed and to hold them in contact with the molds during the beginning of the opening movement.

7. A press for shaping and curing tires from bands, two relatively movable mold sections having bead seats, a pair of rings between the mold sections, and means acting on said rings during the commencement of the opening movement of the press to hold the beads of the tire against the bead seats and thereby spread the tire.

8. A press for shaping and curing tires, two relatively movable mold sections, a pair of rings between the mold sections, means acting on the rings during the commencement of the opening movement of the press to spread the beads of the tire, and a drain in communication with the interior of the tire to allow any liquid to drain from the tire.

9. Means for use in a press for shaping and curing tires from bands and having two relatively movable mold sections comprising, a pair of rings between the edges of the tire and between the mold sections, and means to manipulate said rings to spread them apart against the resistance of the mold sections while the press is closed, to further spread the rings apart during the commencement of the mold opening movement and to raise at least one ring during further opening of the press.

10. Means to exert pressure forcing the beads of the tire against the mold during the curing period comprising, two separable rings between the beads of the tire said rings overlying the inner surfaces of the tire above the beads, and fluid operated means to force the rings apart while the mold is closed.

11. Means to exert pressure forcing the beads of the tire against the mold during the curing period comprising, two separable rings between the beads of the tire, a plurality of levers between the rings, and means to rock said levers to force the rings apart while the mold is closed.

12. Means for use in curing tires in a press comprising, two rings between the beads of the tire, means located between the rings and movable to spread the rings while the mold is closed to force the beads of the tire against the molds during the curing period and during the beginning of the mold opening movement.

13. In a press for curing tires with fluid pressure exerted directly on the tire, a separable mold and means for moving the molds together, two rings between the beads of the tire, means to support the rings out of contact with the beads of the tire until the press is closed, and means operative thereafter to force the beads of the tire against the mold during the curing period, said last named means comprising a plurality of levers located between the rings and means to move said levers in unison to spread the rings apart.

14. In a press for shaping and curing a tire with fluid pressure exerted directly on the inner surface of the tire, mold sections in the press, means for moving the mold sections together with a tire band between them, two rings located between the beads of the tire, said rings having a greater external diameter than the internal diameter of the tire beads, and overlying the inner surface of the tire above the beads, and means to spread the rings apart while the mold sections are closed to force the beads of the tire against the mold sections during the curing period.

References Cited in the file of this patent

UNITED STATES PATENTS

| | | |
|---|---|---|
| 1,868,791 | Cleveland | July 26, 1932 |
| 1,942,797 | Bittaker | Jan. 9, 1934 |
| 1,989,363 | Iverson | Jan. 29, 1935 |
| 2,133,036 | Moricle | Oct. 11, 1938 |
| 2,243,532 | Maynard | May 27, 1941 |
| 2,407,806 | Arnold et al. | Sept. 17, 1946 |
| 2,443,955 | Guzik | June 22, 1948 |
| 2,495,664 | Soderquist | Jan. 24, 1950 |
| 2,571,258 | Kolins | Oct. 16, 1951 |
| 2,699,572 | Soderquist | Jan. 18, 1955 |